United States Patent

Gaiser et al.

[11] 3,977,626
[45] Aug. 31, 1976

[54] MAGNETIC TAPE CARTRIDGE

[75] Inventors: Dieter Gaiser, Diersheim; Gustav Loewenberg, Ludwigshafen; Horst Fitterer, Heidelberg-Hasenleiser; Uwe Woweries, Bad Duerkheim, all of Germany

[73] Assignee: BASF Aktiengesellschaft, Ludwigshafen (Rhine), Germany

[22] Filed: Aug. 15, 1974

[21] Appl. No.: 497,665

[30] Foreign Application Priority Data

Aug. 17, 1973 Germany............................ 7330078

[52] U.S. Cl................................. 242/199; 242/210
[51] Int. Cl.².......................................... G11B 23/10
[58] Field of Search .......... 242/199, 200, 197, 198, 242/210, 71.2; 360/93, 96

[56] References Cited
UNITED STATES PATENTS

| | | | |
|---|---|---|---|
| 3,367,592 | 2/1968 | Smith | 242/200 X |
| 3,556,434 | 6/1971 | Koeppe | 242/199 |
| 3,666,203 | 5/1972 | Sato et al. | 242/197 |
| 3,712,559 | 1/1973 | Schwartz | 242/199 |
| 3,804,351 | 4/1974 | Kaneko | 242/71.2 |

*Primary Examiner*—George F. Mautz
*Attorney, Agent, or Firm*—Johnston, Keil, Thompson & Shurtleff

[57] ABSTRACT

A magnetic tape cartridge having at least one tape pack contains liners which form guide channels for the outer turns of the pack and/or for magnetic tape being wound or unwound and also include resilient sections for locating the tape pack and/or the winding hub in the central plane of the cartridge. The magnetic tape cartridge of the invention can be used with particular advantage as a compact cassette beacause of its outstanding reliability in operation.

6 Claims, 7 Drawing Figures

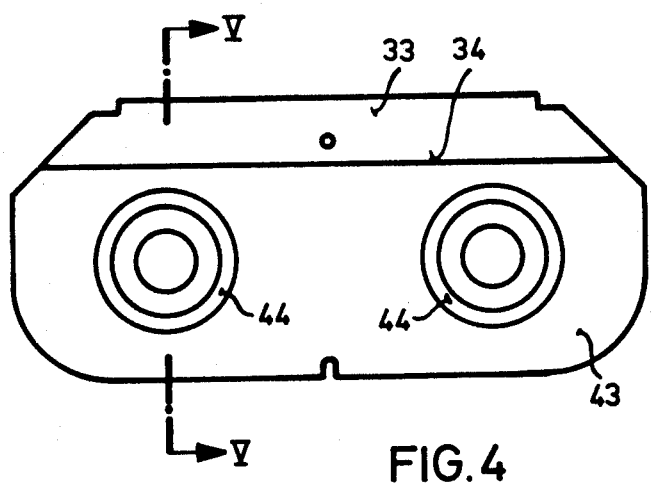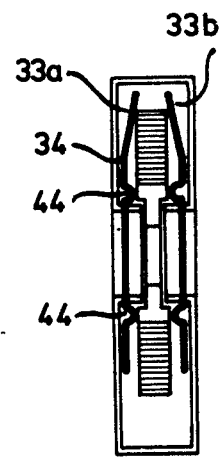
FIG.4  FIG.5
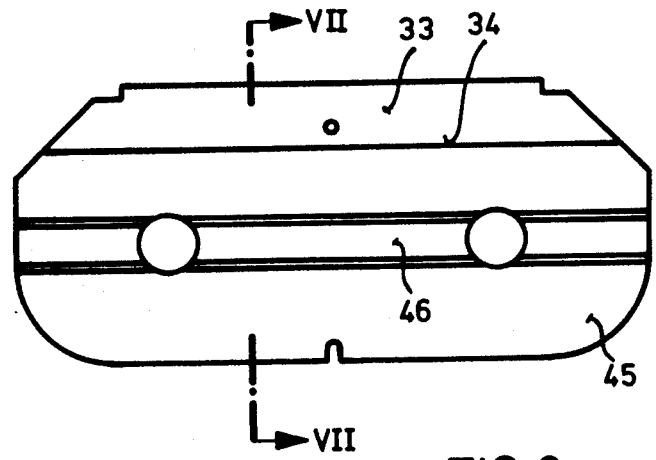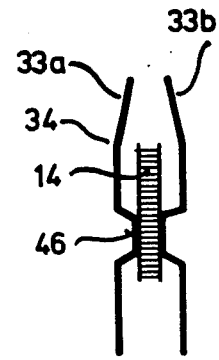
FIG.6  FIG.7

MAGNETIC TAPE CARTRIDGE

This invention relates to a magnetic tape cartridge, especially a compact cassette, with at least one tape winding hub onto which and/or from which magnetic tape can be wound or unwound, at least one liner being arranged between the pack of magnetic tape and the upper and lower cartridge walls, each of the liners being provided with at least one resilient portion which guides the pack.

In German published application (DOS) No. 1,962,628, for example, liners with curved portions are disclosed for magnetic tape cartridges with juxtaposed reels, which curved portions are resiliently urged against the tape packs such that they bear against their horizontal surfaces. The liners are also intended to bear on the outer zones of the packs located at either end of the cartridge and on the upper and lower edges of magnetic tape which is being wound or unwound. Almost without exception, all these types of liner are provided, in the longitudial direction, with a portion convexly curved toward the pack surfaces. As a result, pressure is applied to the hubs, the inner turns of the pack, the outer turns of the pack and the edges of the winding or unwinding magnetic tape within a comparatively narrow rectangular region above and below the pack, so that the tape winding operation is rendered more uniform. However, these known types of liner are practically incapable of preventing "slipping" of the outer turns of the pack and/or "seizure" of the coil between the upper and lower cartridge walls.

The term "slipping", as used in this specification, refers to the following hazard: one ore more turns of magnetic tape at the periphery of the pack slide up or down and, during further winding, slip into the space between the pack and the upper or lower cartridge wall, so that the tape jams between the pack and the upper or lower wall. A tape which has jammed in this way can no longer be transported. Visible symptoms of such jamming are tape escaping from the openings in the front wall of the cartridge, tape coiling itself around the capstan of the recorder and, eventually, jamming of the cartridge, with complete immobility of the tape and the tape coil.

The term "seizure", as used herein, refers to the following hazard: the frictional torque of the tape pack increases to such an extent during the tape winding operation that it becomes greater than the torque of the drive shaft; in this condition, the pack stops and the tape ceases to be wound. This frictional torque builds up when the pack is unevenly wound in the cartridge and eventually begins to rub against the upper and lower walls. A pack is said to be wound unevenly when its shape deviates from that of a disc, i.e. for example when individual layers of tape protrude from the pack or when the pack assumes a saucer or ridged shape.

A seized cartridge develops the same kind of trouble as that described above in connection with "slipping".

In Petty German Pat. No. 7,116,933, another liner is disclosed which has parallel linear embossed projections extending in a longitudinal direction. In addition, longitudinal peripheral strips of the liner are bent toward the associated upper and lower cartridge walls, so that the liners are supported on the inner walls of the housing. This liner has much the same properties as the above-described liner; it is not an effective remedy against slipping or seizure.

In Petty German Pat. No. 1,996,273 a liner is disclosed which is provided with radial crimpings adjacent to the tape pack surfaces. In the longitudinal direction of the cartridge these crimpings are also arranged in the central region of the pack surfaces, so that the packs are centered in the plane of rotation a little more effectively. On the other hand, slipping or seizure is only countered by extremely narrow resilient embossed projections which cannot perform this function adequately.

A magnetic tape cartridge is known which is provided with liners with a fold along the central longitudinal axis of the cartridge, the fold pointing toward the associated upper or lower wall, so that the lateral portions of the liner cover the tape pack like a gently sloping roof and extend at an angle of about 5° relative to the associated lower or upper wall. Apart from having, at most, a slight centering effect on the tape pack in the plane of rotation, this arrangement can scarcely prevent slipping or seizure because the liner exerts little or no pressure on the peripheral zone of the tape pack.

According to Petty German Pat. No. 7,124,132, the outer turns of the tape pack are prevented from slipping from the pack by means of a leaf spring bearing on the pack. The effective force of this leaf spring must be extremely low and must be within very narrow limits of tolerance in order to ensure the application of a specific braking force to the pack. This is difficult to achieve in manufacture. Moreover, such a leaf spring constitutes an additional element in the cartridge and therefore makes the cartridge more expensive to manufacture.

According to Petty German Pat. No. 7,238,740, specially shaped liners are arranged above and below the tape packs such that guide channels for the outer turns of the pack and/or the magnetic tape being wound or unwound are formed, each of these guide channels being delimited on one side by the tape pack. Although "slipping" is effectively prevented by these known liners, a big improvement in the guidance of the tape being wound can only be achieved if more costly hub bearings with less pay are used than in known compact cassettes.

Petty German Pat. No. 7,271,230 discloses circular liners with embossed projections arranged concentrically with respect to the axes of rotation of the packs and which cooperate with the hubs. All that is achieved with these known circular liners is an improved positioning of the hubs in the central plane between the cassette walls.

As may be gathered from the foregoing discussion of prior art magnetic tape cartridges, none of the conventional designs is capable of meeting more than one of the following requirements:
1. the tape should be so guided that it is wound and unwound uniformly;
2. the tape packs should be located substantially in the central plane of the cartridge, especially when they rotate; and
3. slipping should be prevented.

An object of the present invention is to provide simple means for satisfying at least two of the above requirements and thus to greatly improve conventional magnetic tape cartridges.

According to the invention, this object is achieved with liners arranged symmetrically with respect to the central plane of the cartridge which not only form at least one guide channel, known per se, for the outer turns of the pack and/or for the magnetic tape being wound or unwound, but also include resilient zones for locating the tape pack and/or the hub in the central plane of the cartridge.

With a liner design of this kind, a uniform flat tape pack is obtained due to the tape being accurately guided as it joins and leaves the pack and to the pack being supported, and at the same time the tape pack and/or the hub is centered in the plane of rotation.

In an advantageous embodiment of the magnetic tape cartridge according to the invention, the liners are each provided with a first portion bearing against the upper and lower wall surfaces, a second portion provided with resilient zones which guide the hub and/or the pack and/or the tape, and a third portion which is provided with a bent-over section extending parallel to the central longitudinal axis of the liner, thus forming a guide channel for the outer turns of the pack.

This prevents slipping and seizure, thus ensuring trouble-free cartridge operation in a simple manner.

According to another advantageous embodiment of the magnetic tape cartridge according to the invention, the second portion of each liner is provided with a longitudinal resilient zone arranged above and below the tape pack and hub.

In yet another advantageous embodiment of the magnetic tape cartridge according to the invention, the second portion of each liner may also be provided with at least one linear resilient projection which is arranged radially with respect to the pack across the path of the winding or unwinding tape. In cartridges having two coplanar reels arcuate resilient projections may be provided between the apertures in the liner for admitting the drive spindles. The above projections may be replaced by annular resilient projections which are arranged concentrically with respect to the rotational axis of the hub.

Embodiments of magnetic tape cartridges according to the invention will now be described with reference to the accompanying drawings:

FIG. 4 is a further modified liner with a longitudinal fold and annular projections;

FIG. 5 is a cross-sectional view of a compact cassette with liners according to FIG. 4 (on line V—V of FIG. 4);

FIG. 6 shows a yet further modified liner with five longitudinal folds; and

FIG. 7 is a cross-sectional view of two liners according to FIG. 6 (on line VII—VII of FIG. 6.)

Figure 1:
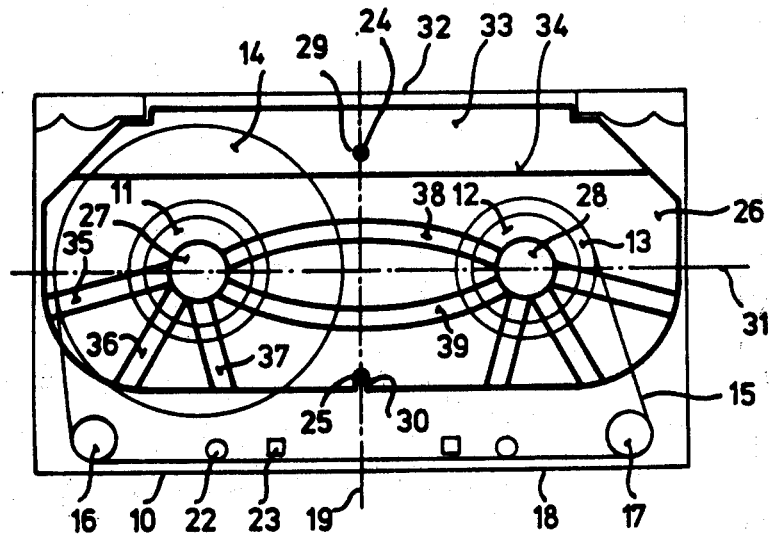
FIG. 1 shows a compact cassette with liners according to the invention.

A compact cassette 10 contains magnetic tape 15 wound on coplanar hubs 11 and 12 to form tape packs 13 and 14. Between the tape packs 13 and 14 the magnetic tape 15 runs over idler rolls 16 and 17, so that it is guided parallel to the front wall 18 of the cassette. In the front wall 18 there are provided apertures, not shown here, through which the magnetic heads and the pinch roller on the recorder can enter the cassette. Symmetrically with respect to the transverse central axis 19 of the cassette 10, apertures 22 and 23 are provided in the lower and upper walls 20 and 21 through which the recorder-associated capstan and/or tape guide pins can pass. In the plane of the transverse central axis 19, pins 24 and 25 are molded integrally with the lower end upper walls 20 and 21, which pins serve to secure liners 26. The liners 26 are provided with circular apertures 27 and 28 above and below the openings in the hubs 11 and 12. The liners 26 are substantially rectangular, with chamfered corners, thus being adapted to the interior of the cassette 10. For the pins 24 and 25, a small circular aperture 29 and a cutout 30 are provided in each of the two liners 26. Provision of these fastening means and conformation of the shape of the liners to the cassette interior ensure that the liners 26, after insertion, retain their correct position in the cassette part with which they are associated.

Between the line 31 passing through the axes of rotation of the hubs and the rear wall 32, the liners 26 have a bent-over portion 33, the fold being shown as a solid line 34. Similar portions 33 are provided on all the liners still to be described here. By means of these portions 33, guide channels are formed at the rear of the tape pack which effectively prevent slipping in particular.

Figure 3:
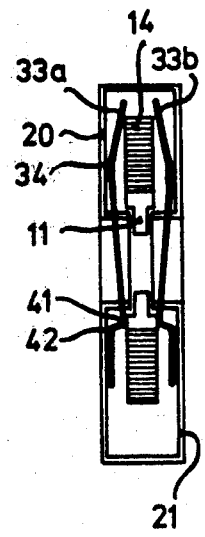
FIG. 3 is a cross-sectional view of a compact cassette with liners according to FIG. 2 (on line II—II of FIG. 2)

The fold 34 is advantageously situated between half the tape pack diameter and the maximum tape pack diameter. As can be seen from FIGS. 3 and 5 in which portions 33a and 33b bear on the periphery of the tape pack, pressure is exerted by these liner portions on the outer turns of the pack which are thus guided and supported.

The front corner regions of the liners 26 are provided with linear resilient projections 35, 36 and 37 extending radially with respect to the center of the circular apertures 27 and 28 over the tape packs 13 and 14 and the hubs 11 and 12. Furthermore, arcuate resilient projections 38 and 39 are provided between the circular apertures 27 and 28 of the liners 26. They extend more or less symmetrically with respect to line 31. The projections 35 to 39 can be made by known embossing methods for thermoplastic materials.

The hubs and tape packs are resiliently supported and the magnetic tape is accurately guided as it joins and leaves the pack by the above-described projections 35–39, the winding and unwinding operations thus being rendered more uniform.

Figure 2:
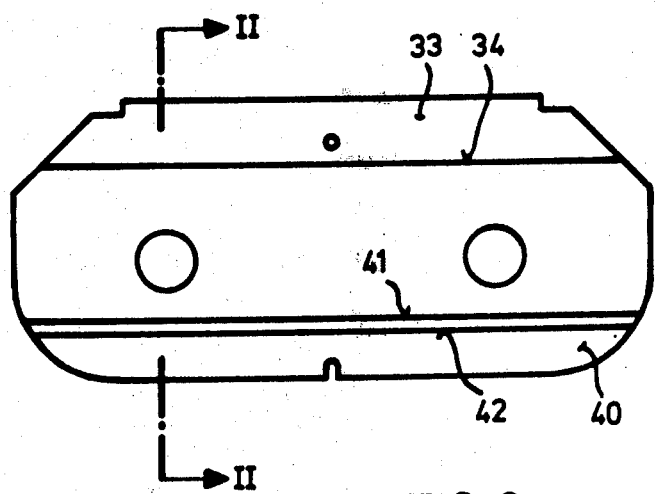
FIG. 2 shows a modified liner for the cassette of FIG. 1, with three longitudinal folds.

FIG. 2 shows a liner 40 with a fold 34 and further folds 41 and 42 in the front portion of the liner 40, the folds 34, 41 and 42 extending substantially parallel to the longitudinal central axis of the liner. Whereas the folds 34 bear on the lower and upper cassette walls 20 and 21, the folds 41 make contact with the hubs. Starting at fold 42, the anterior portions of the liners bear on the lower and upper cassette walls. With this liner design, slipping and seizure are avoided in a simple manner and guidance of the tape as it joins and leaves the pack is considerably improved.

In addition to the fold 34, liner 43 of FIG. 4 is provided with annular projections 44 whose arcuate shape can be seen in FIG. 5. These projections 44 act directly upon the hubs, so that centering of the hubs and tape packs in the plane of rotation is improved. FIGS. 6 and 7 respectively show a liner 45 in plan and in cross-section, which liner, in addition to the fold 34, has a wide flat longitudinal projection 46 which resiliently bears on the hubs and tape packs and has a centering effect thereon.

It is obvious that in the case of different liner designs the projections may be arranged in a different manner and have cross-sectional shapes other than those described and illustrated here. When dimensioning the resilient zones of such liners, whose thickness is in the region of 20 to 50 $\mu$, it should be borne in mind that, owing to the comparatively low weight of the hubs and tape packs, even small projections may suffice to locate the tape pack and hub in the central plane of the cartridge.

It is surprising that the off-center arrangement of the longitudinal projections results in improved centering of the tape pack and the hub in the plane of rotation. Besides, reel torque may be reduced by appropriate choice of the liner material, such as polyester film, the use of lubricants and the shape and arrangement of the projections.

It is not intended, by the description herein, to limit the invention to the disclosed types of cartridge.

We claim:

1. A magnetic tape cartridge with at least one tape-winding hub and with a pair of liners arranged symmetrically with respect to the mid-plane of the cartridge and interposed between the pack of wound tape and the upper and lower cartridge walls, respectively; said liners having end portions formed with an inclination towards said mid-plane so as to angle towards each other, in a direction radially outwardly of said hub, from a radially inner zone where they are at a substantial distance from the tape pack to and beyond a radially outer zone at which outer zone they engage the outer turns of the tape pack and so as to provide between them a guide channel for said outer turns, said channer at its bottom being delimited by the tape pack itself; and said liners having, spaced from said end portions in a direction opposite to said first-mentioned direction, other portions including resilient zones which engage the central area of the hub and tape pack combination to locate said combination in said mid-plane of the cartridge.

2. A cartridge according to claim 1, wherein said liners at said radially inner zone are formed to bear against the lower and upper cartridge walls, respectively, and wherein said end portions extend parallel to the longitudinal central axis of the liners.

3. A cartridge according to claim 1, wherein said resilient zones extend longitudinally above and below said hub and tape pack combination.

4. A cartridge according to claim 1, and having two coplanar hubs, wherein said resilient zones comprise at least one resilient projection extending radially with respect to the axes of rotation of the hubs in the corner regions of each liner adjacent to the front wall of the cartridge, and elongated resilient projections on the liner between the axes of rotation of the hubs.

5. A cartridge according to claim 1, wherein said resilient zones comprise between the front wall of the cartridge and the longitudinal central axis of each liner a longitudinal resilient projection in the form of a substantially angular shoulder.

6. A cartridge according to claim 1, wherein said resilient zones comprise, extending along the region of the central axis of said liner, a longitudinal projection of a trapezoid cross section such that said liners engage the two sides, respectively, of said hub and tape pack combination along relatively wide central areas.

* * * * *